United States Patent
Namba

(10) Patent No.: US 8,149,475 B2
(45) Date of Patent: Apr. 3, 2012

(54) APPARATUS, METHOD, AND COMPUTER PROGRAM PRODUCT FOR PROCESSING IMAGE

(75) Inventor: Mutsumi Namba, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 731 days.

(21) Appl. No.: 12/250,184

(22) Filed: Oct. 13, 2008

(65) Prior Publication Data
US 2009/0109503 A1  Apr. 30, 2009

(30) Foreign Application Priority Data

Oct. 30, 2007  (JP) .................................. 2007-282116
Aug. 11, 2008  (JP) .................................. 2008-206989

(51) Int. Cl.
*H04N 1/04* (2006.01)
(52) U.S. Cl. .......................... 358/474; 358/444; 358/471
(58) Field of Classification Search .......................... None
See application file for complete search history.

(56) References Cited

U.S. PATENT DOCUMENTS

| | | | | |
|---|---|---|---|---|
| 5,020,115 A | * | 5/1991 | Black ............................ | 382/298 |
| 5,335,290 A | * | 8/1994 | Cullen et al. .................. | 382/176 |
| 5,373,371 A | * | 12/1994 | Masui ............................ | 358/444 |
| 6,118,463 A | | 9/2000 | Houki et al. | |
| 6,807,320 B1 | * | 10/2004 | Sawada ......................... | 382/289 |
| 6,917,991 B2 | | 7/2005 | Namba | |
| 7,843,604 B2 | * | 11/2010 | Higashiyama et al. ........ | 358/1.9 |
| 2008/0074712 A1 | * | 3/2008 | Nakagawa ..................... | 358/474 |
| 2008/0075363 A1 | * | 3/2008 | Matsuzaki et al. ............ | 382/162 |
| 2008/0107137 A1 | * | 5/2008 | Yasui ............................ | 370/516 |

FOREIGN PATENT DOCUMENTS

| | | |
|---|---|---|
| JP | 3-142412 | 6/1991 |
| JP | 10-315545 | 12/1998 |
| JP | 2002-94764 | 3/2002 |
| JP | 2007-88928 | 4/2007 |
| JP | 2007-112016 | 5/2007 |
| JP | 2007-155764 | 6/2007 |

* cited by examiner

*Primary Examiner* — Twyler Haskins
*Assistant Examiner* — Helen Q Zong
(74) *Attorney, Agent, or Firm* — Oblon, Spivak, McClelland, Maier & Neustadt, L.L.P.

(57) ABSTRACT

An image processing apparatus includes an address specifying unit, a reading unit, a writing unit, and a shifting unit. The address specifying unit specifies an address in a storage device that stores therein pixel data of an image. The reading unit reads the pixel data from the address by a line pixel amount. The writing unit writes the pixel data in an output storage unit. The shifting unit shifts the address in either one of a first direction along a sub-scanning direction and a second direction opposite to the first direction by a predetermined amount.

14 Claims, 13 Drawing Sheets

WHEN START ADDRESS=BURST BOUNDARY ADDRESS

WHEN LOWER 6 bits OF START ADDRESS=0×3c

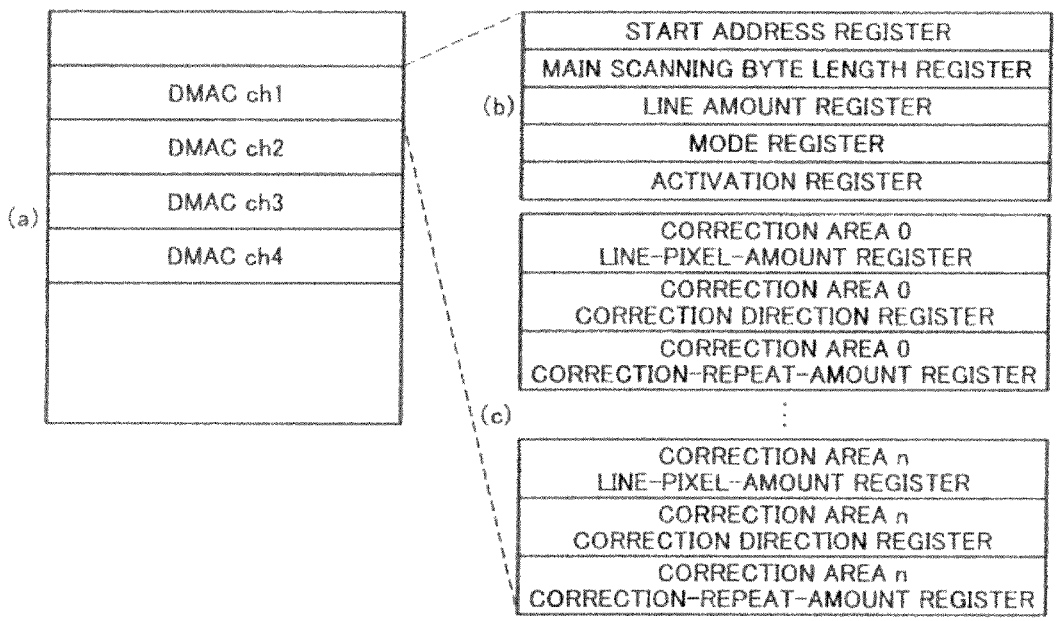

FIG. 10

| LINE AMOUNT REGISTER 0x10000008 | 31 30 29 28 27 26 25 24 23 22 21 20 19 18 17 16 15 14 13 12 11 10 9 8 7 6 5 4 3 2 1 0 |
|---|---|
| | LINE |
| | RW |
| INITIAL VALUE | 0 0 0 0 0 0 0 0 0 0 0 0 0 0 0 0 0 0 0 0 0 0 0 0 0 0 0 0 0 0 0 0 |

FIG. 11

| MODE REGISTER 0x1000000C | 31 30 29 28 27 26 25 24 23 22 21 20 19 18 17 16 15 14 13 12 11 10 9 8 7 6 5 4 3 2 1 0 |
|---|---|
| | ROT_180   PIXEL |
| | RO   RW   RO   RW |
| INITIAL VALUE | 0 0 0 0 0 0 0 0 0 0 0 0 0 0 0 0 0 0 0 0 0 0 0 0 0 0 0 0 0 0 0 0 |

FIG. 12

| ACTIVATION REGISTER 0x10000010 | 31 30 29 28 27 26 25 24 23 22 21 20 19 18 17 16 15 14 13 12 11 10 9 8 7 6 5 4 3 2 1 0 |
|---|---|
| | EXEC |
| | RO   RW |
| INITIAL VALUE | 0 0 0 0 0 0 0 0 0 0 0 0 0 0 0 0 0 0 0 0 0 0 0 0 0 0 0 0 0 0 0 0 |

FIG. 13

| CORRECTION AREA 0 LINE-PIXEL-AMOUNT REGISTER | 31 30 29 28 27 26 25 24 23 22 21 20 19 18 17 16 15 14 13 12 11 10 9 8 7 6 5 4 3 2 1 0 |
|---|---|
| | REGION 0 WIDTH |
| 0x10000100 | RW |
| INITIAL VALUE | 0 0 0 0 0 0 0 0 0 0 0 0 0 0 0 0 0 0 0 0 0 0 0 0 0 0 0 0 0 0 0 0 |

FIG. 14

| CORRECTION AREA 0 CORRECTION DIRECTION REGISTER | 31 30 29 28 27 26 25 24 23 22 21 20 19 18 17 16 15 14 13 12 11 10 9 8 7 6 5 4 3 2 1 0 |
|---|---|
| | REGION 0 DIRECTION |
| 0x10000104 | RO · · · RW |
| INITIAL VALUE | 0 0 0 0 0 0 0 0 0 0 0 0 0 0 0 0 0 0 0 0 0 0 0 0 0 0 0 0 0 0 0 0 |

FIG. 15

| CORRECTION AREA 0 CORRECTION-REPEAT-AMOUNT REGISTER | 31 30 29 28 27 26 25 24 23 22 21 20 19 18 17 16 15 14 13 12 11 10 9 8 7 6 5 4 3 2 1 0 |
|---|---|
| | REGION 0 REPEAT |
| 0x10000108 | RW |
| INITIAL VALUE | 0 0 0 0 0 0 0 0 0 0 0 0 0 0 0 0 0 0 0 0 0 0 0 0 0 0 0 0 0 0 0 0 |

APPARATUS, METHOD, AND COMPUTER PROGRAM PRODUCT FOR PROCESSING IMAGE

CROSS-REFERENCE TO RELATED APPLICATIONS

The present application claims priority to and incorporates by reference the entire contents of Japanese priority document 2007-282116 filed in Japan on Oct. 30, 2007 and Japanese priority document 2008-206989 filed in Japan on Aug. 11, 2008.

BACKGROUND OF THE INVENTION

1. Field of the Invention

The present invention relates to a technology for processing image data to be written by a write control device.

2. Description of the Related Art

In an image forming apparatus based on electrophotography, a photosensitive element is scanned with a light beam to write a latent image on the photosensitive element. The latent image formed on the photosensitive element is sometimes skewed because a running axis of the photosensitive element does not make a right angle with an optical axis of the light beam. Sometimes the latent image is distorted because of a distortion of the optical axis.

To perform correction on such a writing characteristic, for example, Japanese Patent Application Laid-open No. H03-142412 discloses an image forming apparatus in which the optical axis is physically shifted by using a motor. However, this technique requires additional costs for the motor.

Japanese Patent Application Laid-open No. 2007-88928 discloses an image forming apparatus by which the correction on the image can be performed with lower costs. Specifically, the image forming apparatus includes line buffers for storing data corresponding to a plurality of lines of the image therein. When image data is read from the line buffers before the image data is written by an image processing operation, the image data is shifted in the sub-scanning direction to correct distortion of the image.

However, in the technology disclosed in Japanese Patent Application Laid-open No. 2007-88928, a correction amount of the image is limited to the number of the lines for which the line buffers are provided, and a built-in buffer (built-in memory) included in the image forming apparatus is expensive. Furthermore, because the number of the lines is determined when the image forming apparatus is designed, the number of the lines cannot be dynamically changed.

SUMMARY OF THE INVENTION

It is an object of the present invention to at least partially solve the problems in the conventional technology.

According to an aspect of the present invention, there is provided an image processing apparatus including an address specifying unit that specifies an address in an input storage device that stores therein pixel data of an image obtained by optically reading the image at predetermined read positions; a reading unit that reads the pixel data from the input storage device at the address specified by the address specifying unit by a line pixel amount indicating number of pixels forming a line in a main scanning direction; a writing unit that writes the pixel data read by the reading unit in an output storage unit that stores therein image data to be output to a write control device that performs write control of an image; and a shifting unit that shifts by a predetermined amount the address specified by the address specifying unit in either one of a first direction along a sub-scanning direction, which is perpendicular to the main scanning direction, and a second direction opposite to the first direction.

According to another aspect of the present invention, there is provided an image processing method including specifying an address in an input storage device that stores therein pixel data of an image obtained by optically reading the image at predetermined read positions; reading the pixel data from the input storage device at the address specified at the specifying by a line pixel amount indicating number of pixels forming a line in a main scanning direction; writing the pixel data read at the reading in an output storage unit that stores therein image data to be output to a write control device that performs write control of an image; and shifting by a predetermined amount the address specified at the specifying in either one of a first direction along a sub-scanning direction, which is perpendicular to the main scanning direction, and a second direction opposite to the first direction.

According to still another aspect of the present invention, there is provided a computer program product that includes a computer-readable recording medium and a computer program stored in the readable recording medium, the computer program when executed on a computer causes the computer to execute the above image processing method.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 7 is a diagram of a memory map for explaining examples of parameters that are stored in a memory shown in FIG. 1 and are set in a group of registers included in the DMA controllers;

FIGS. 8 to 15 are diagrams for explaining examples of the parameters set in the group of registers;

DETAILED DESCRIPTION OF THE PREFERRED EMBODIMENTS

Exemplary embodiments of the present invention are explained in detail below with reference to the accompanying drawings.

An image processing apparatus according to an embodiment of the present invention can be applied to various apparatuses, such as a laser printer, a digital copier, a facsimile machine, and a digital multifunction product (MFP), that include a write control device and an optical write device and employ an electrophotographic system.

Figure 1:
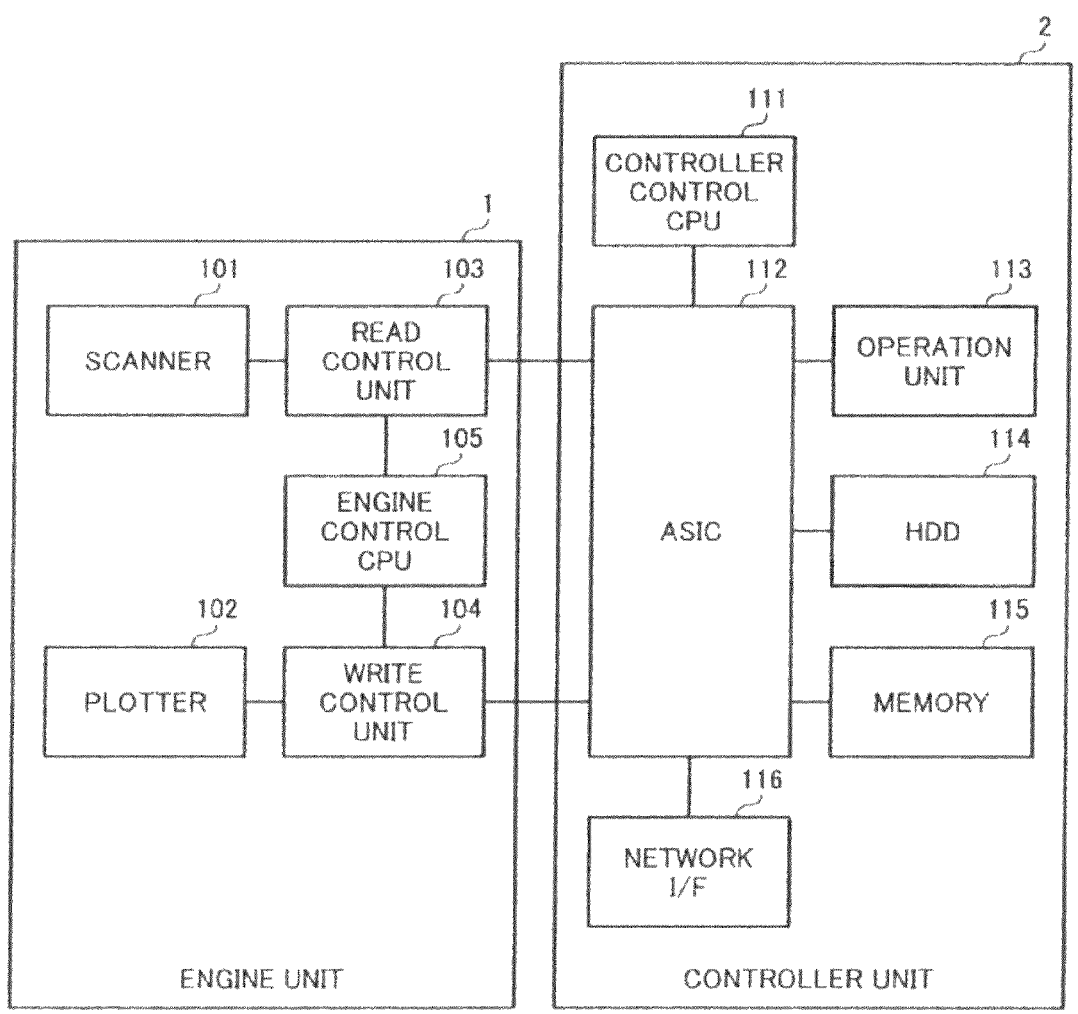
FIG. 1 is a block diagram for explaining the basic configuration of an image forming apparatus according to an embodiment of the present invention.

FIG. 1 is a block diagram for explaining the basic configuration of an image forming apparatus according to the embodiment.

The image forming apparatus is the MFP, and includes an engine unit 1 and a controller unit 2 (image processing apparatus). The image forming apparatus can be other types of image forming apparatus, such as the laser printer, the digital copier, and the facsimile machine instead of the MFP.

The engine unit 1 includes a scanner 101, a plotter 102, a read control unit 103, a write control unit 104, and an engine control central processing unit (CPU) 105.

The scanner 101 is an image reading unit that reads an image of an original.

The plotter 102 is an image forming unit that receives image data developed in a memory 115 included in the controller unit 2 via an application specific integrated circuit (ASIC) 112 included in the controller unit 2 and the write control unit 104 and that prints out the received image data as a visible image on a recording medium, such as a sheet.

The plotter 102 includes an optical write device that emits laser beams corresponding to four colors, i.e., cyan (C), magenta (M), black (K), and yellow (Y). When a full-color image is printed out, one line of an image is written by one scanning operation performed by a polygon mirror (not shown) with the laser beam corresponding to each of the colors. Because the technology of writing the image with the laser beam is well known, detailed explanation on the technology is omitted.

The read control unit 103 controls the scanner 101 to read the image of the original.

The write control unit 104 controls the optical write device to write an image with a plurality of laser beams emitted from a plurality of laser diodes that is a laser light source.

The engine control CPU 105 is operated in accordance with a computer program stored in a read-only memory (ROM) (not shown), so that the engine control CPU 105 controls each of the units included in the engine unit 1.

The controller unit 2 includes a controller control CPU 111, the ASIC 112, an operation unit 113, a hard disk drive (HDD) 114, the memory 115, and a network interface (I/F) 116. The operation unit 113 is arranged outside the controller unit 2.

The controller control CPU 111 is operated in accordance with a fixed computer program stored in a ROM (not shown) and a computer program developed in the memory 115, so that the controller control CPU 111 controls each of the units included in the controller unit 2.

The ASIC 112 is a device board with multiple functions. The ASIC 112 improves sharing of devices to be controlled by the controller control CPU 111, and improves efficiency in development of an application program or the like in terms of architecture.

The operation unit 113 includes various operation keys (an operation switch or an operation button) to input data, such as an operation instruction, to the engine unit 1 based on selection of an image processing function provided by the image forming apparatus, and a display device, such as a liquid crystal display (LCD) or a cathode ray tube (CRT).

The HDD 114 is a nonvolatile storage unit that stores therein a large quantity of data. The HDD 114 can store therein a computer program including an operating system (OS), some values (fixed values) of parameters set in a register block of each of direct memory access (DMA) controllers 201 to 204 that will be described later, and various data such as image data (digital image signal). The data stored in the memory 115 can be stored in the HDD 114.

The memory 115 is a storage unit, such as a random access memory (RAM), to be used as a computer program memory that stores therein various computer programs, a work memory used by the controller control CPU 111 for performing data processing, a parameter memory that temporarily stores therein a correction parameter that will be described later, and an image memory in which image data is developed. The memory 115 stores therein pixel data (color data, or the like) of an image obtained by optically reading the image at predetermined read positions. Specifically, the memory 115 stores therein the pixel data such that a memory controller 213 can specify the main scanning direction in which the image is optically read and the sub-scanning direction perpendicular to the main scanning direction with respect to the image data, and shift the image data in the specified direction to read the pixel data. The technique of storing the image data can be any technique including a conventional technique. The configuration and the operation of the memory controller 213 will be explained in detail later.

The network I/F 116 performs communication with an external device (not shown) via a network (not shown).

The image data to be printed out (the image data by which an image is formed) includes various data, such as data obtained by the scanner 101 (red, green, and blue (RGB) image data), data input from the network I/F 116, and data stored in the HDD 114. When a printing operation of a full-color image is performed, the image data is converted into image data corresponding to each of the four colors in advance, and developed in the memory 115. When a printing operation of a black-and-white image is performed, the image data is converted into gray-scale image data in advance, and developed in the memory 115.

In the image forming apparatus having the above configuration, when the power is turned on, the controller control CPU 111 reads various computer programs including application software and the OS stored in the HDD 114 in accordance with a boot program stored in the ROM, and develops the read computer programs in the memory 115. Afterward, the controller control CPU 111 operates in accordance with the computer programs (selectively executes the computer programs as required), and controls the image forming apparatus, so that the controller control CPU 111 can perform various functions including a function of a setting unit according to the embodiment.

Figure 2:
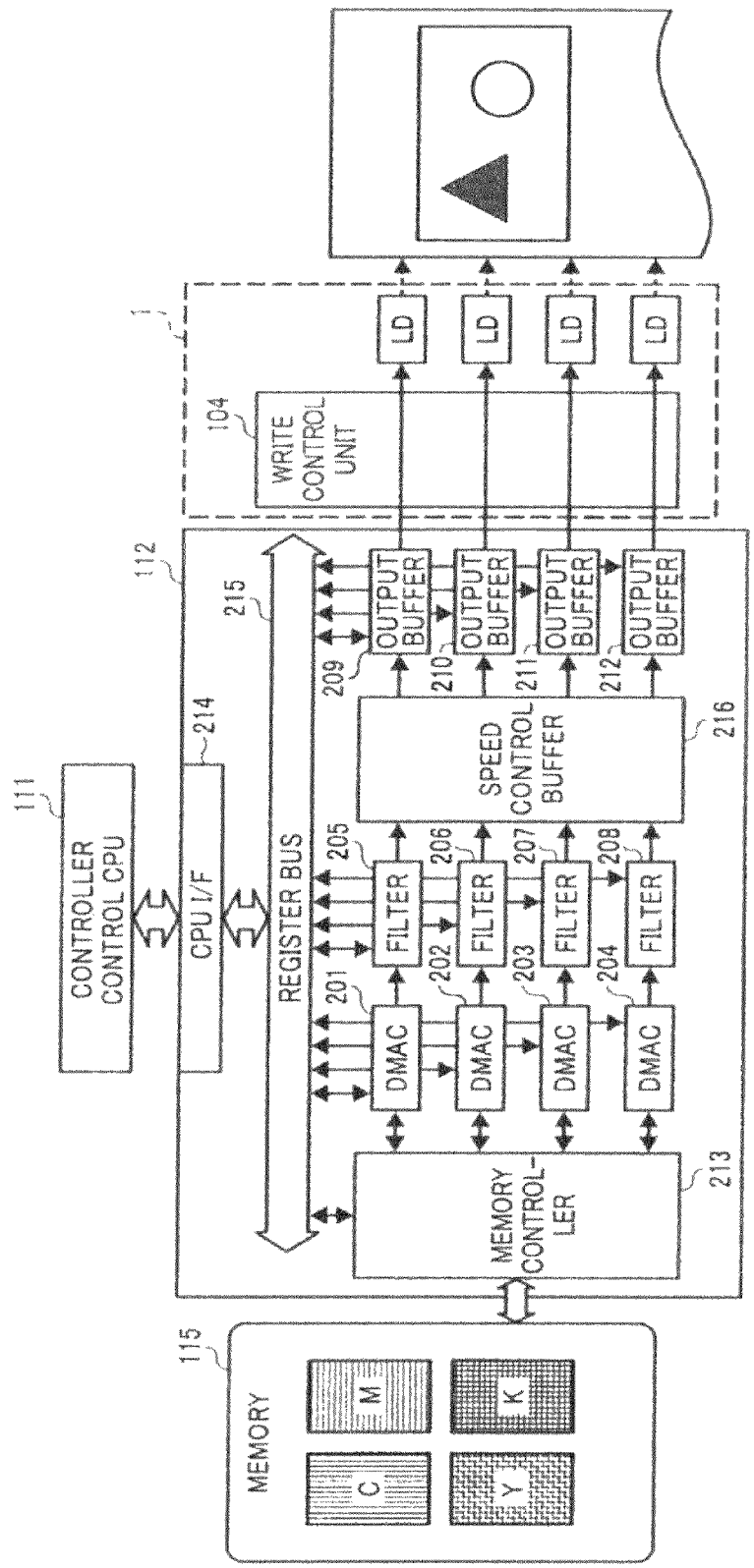
FIG. 2 is a block diagram for explaining the internal configuration of an ASIC shown in FIG. 1 and an example of connections among the ASIC and peripheral devices.

FIG. 2 is a block diagram for explaining the internal configuration of the ASIC 112 and an example of connections among the ASIC 112 and the peripheral devices.

The ASIC 112 includes the DMA controllers 201 to 204, filters 205 to 208, output buffers 209 to 212, the memory controller 213, a CPU I/F 214, a register bus 215, and a speed control buffer 216. The DMA controllers 201 to 204, the filters 205 to 208, and the output buffers 209 to 212 are arranged correspond to the four colors. The DMA controllers 201 to 204, the filters 205 to 208, the output buffers 209 to 212, the memory controller 213, and the CPU I/F 214 are connected via the register bus 215.

The DMA controllers 201 to 204 send a read address to the memory 115 via the memory controller 213, so that the DMA controllers 201 to 204 obtain image data corresponding to the four colors from the memory 115, and then sends the image data to the filters 205 to 208. This operation is referred to as DMA transfer.

The memory controller 213 is an arbitration circuit that performs arbitration of requests from the DMA controllers 201 to 204 and the engine control CPU 105 and that accesses the memory 115 to input/output image data to/from the memory 115.

When the printing operation of the full-color image is performed, the controller control CPU 111 causes the DMA controllers 201 to 204 and the memory controller 213 to read image data corresponding to the four colors from the memory 115. When the printing operation of the gray-scale (black-and-white) image is performed, the controller control CPU 111 causes any one of the DMA controllers 201 to 204 and the memory controller 213 to read the gray-scale image data from the memory 115. In the following description, it is explained a case in which the printing operation of the full-color image is performed.

Figure 6:
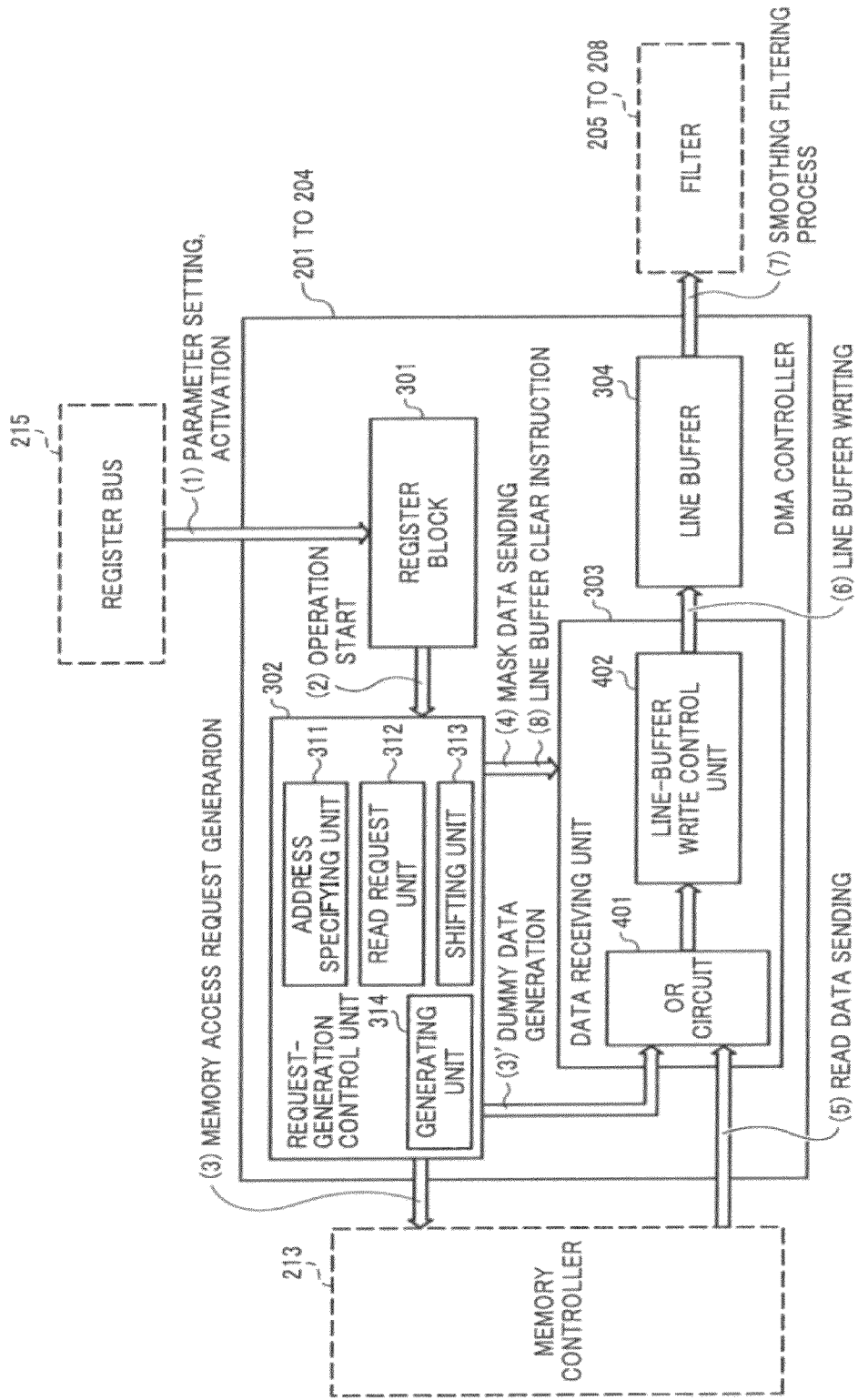
FIG. 6 is a block diagram for explaining the internal configuration of DMA controllers shown in FIG. 2.

The filters 205 to 208 perform a filtering process including edge detection and a smoothing process on image data received from the DMA controllers 201 to 204 (see (7) in FIG. 6). After the filters 205 to 208 perform the filtering process on the image data, the filters 205 to 208 output the image data to the speed control buffer 216.

The speed control buffer 216 temporarily stores therein the image data received from the filters 205 to 208 to absorb a speed difference between a speed (writing speed) at which an image is written with the laser beam and a speed (memory access speed) at which the memory 115 is accessed, and then outputs the image data to the output buffers 209 to 212 at a predetermined timing.

The output buffers 209 to 212 receive the image data from the speed control buffer 216, and output the received image data to the write control unit 104.

Then, the write control unit 104 drives each of the laser diodes in the optical write device based on the image data and causes the corresponding laser beam to be emitted from the laser diode, and the polygon mirror deflects the laser beam whereby the writing operation is performed.

Because the ASIC 112 includes the CPU I/F 214 and the register bus 215, the controller control CPU 111 can access registers included in the DMA controllers 201 to 204.

The memory controller 213 receives specified information on a burst boundary address and a burst access length (hereinafter, simply referred to as "burst length" as appropriate) from the DMA controllers 201 to 204, and sends image data starting from the burst boundary address to the DMA controllers 201 to 204. The burst boundary address is usually allocated in a unit of more than 1 byte. For example, in the case of performing accesses for 16 bursts on a 32-bit bus (4 bytes), the burst boundary address is allocated in a unit of 64 bytes (512 bits).

The burst boundary address is an address in the memory 115, and can be a start point from which reading of image data is started by the memory controller 213. Specifically, the reading of the image data from the memory 115 can be started from only the burst boundary address. The burst boundary address is allocated in a predetermined data length (for example, in a unit of 512 bits), and can be a certain boundary in the memory 115.

The reading of the data is started from the burst boundary address, and the data can be read only in a unit of a predetermined data length. The predetermined data length is referred to as the burst access length (the burst length). The data having the data length of the burst length×N can be read from the burst boundary address.

Figure 3:
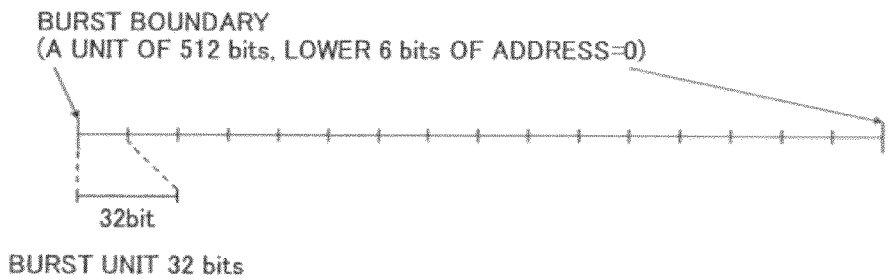
FIG. 3 is a diagram for explaining a burst boundary and a burst unit according to the embodiment.

FIG. 3 is a diagram for explaining a burst boundary and a burst unit according to the embodiment. A distance between the burst boundary addresses is provided in a unit of 512 bits. Specifically, in the case of addressing in a unit of 8 bits, if the lower 6 bits of the address is "0", the address is defined as the burst boundary address (the address "64" (0x40) is the burst boundary address next to the address "0").

Moreover, a data unit for which an access request can be issued as the burst length is set to 32 bits (the lower 2 bits of the address is fixed to "0"). The data can be read until the next burst boundary address. Specifically, it is possible to perform continuous accesses for maximum of 16 bursts from the current burst boundary address to the next burst boundary address.

Figure 4:
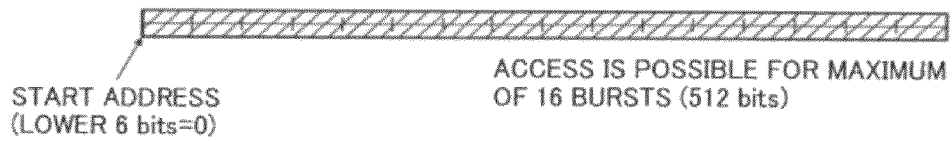
FIG. 4 is a diagram for explaining a data range that can be read when a start address for reading data matches a burst boundary address according to the embodiment.

FIG. 4 is a diagram for explaining a data range that can be read when a start address for reading the data matches the burst boundary address. If the lower 6 bits of the start address is "0", the reading of the image is started from the burst boundary address, and the accesses for maximum of 16 bursts (512 bits) can be performed.

Figure 5:
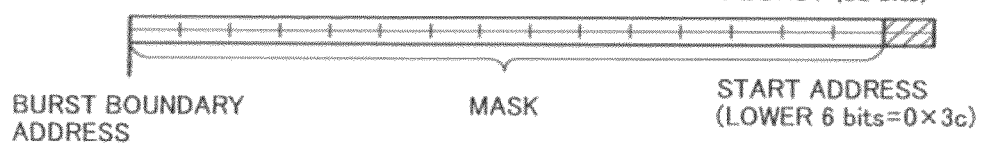
FIG. 5 is a diagram for explaining a data range that can be read when the lower 6 bits of the start address is 0x3c according to the embodiment.

FIG. 5 is a diagram for explaining a data range that can be read when the lower 6 bits of the start address is 0x3c. If the lower 6 bits of the start address is 0x3c, the reading of the image is started from the 16th burst, and therefore the access is possible for only 1 burst (32 bits) before the next burst boundary address. Because the reading of the data can be started from only the burst boundary address, dummy data or the like is embedded for data from the 1st burst to the 15th burst, and then an area corresponding to the dummy data is masked, so that the data can be obtained from the 16th burst.

Because the ASIC 112 includes the DMA controllers 201 to 204, when the scanner 101 optically reads the image, it is possible to perform the correction on the image data stored in the memory 115 for the skew caused by physical misalignment, such as misalignment of the axis of the photosensitive element. Although such correction is performed by a maintenance worker in a conventional technology, the configuration and the operation of the DMA controllers 201 to 204 make it possible to perform the correction.

FIG. 6 is a block diagram for explaining the internal configuration of the DMA controllers 201 to 204.

Each of the DMA controllers 201 to 204 includes a register block 301, a request-generation control unit 302, a data receiving unit 303, and a line buffer 304.

The register block 301 includes a group of registers that are accessed from the register bus 215.

The request-generation control unit 302 includes an address specifying unit 311, a read request unit 312, a shifting unit 313, and a generating unit 314. The request-generation control unit 302 generates a memory access request (see (3) in FIG. 6), and sends the memory access request to the memory controller 213.

The address specifying unit 311 specifies an address in the memory 115 based on the control of the memory controller 213. Specifically, the address specifying unit 311 calculates the burst boundary address and the data length based on the burst length, and specifies the start address for reading the data to the memory controller 213.

The read request unit 312 generates the memory access request to make a read request for reading the data having the data length calculated by the address specifying unit 311 from the address specified by the address specifying unit 311, and then outputs the generated memory access request to the memory controller 213. In accordance with the read request, the memory controller 213 reads data having pixels corresponding to a line pixel amount in the main scanning direction. The line pixel amount indicates the number of pixels forming a line in the main scanning direction when the writing operation is performed.

After the read request unit 312 issues the memory access request, the shifting unit 313 calculates the burst boundary address and the data length for the next reading operation based on the line pixel amount and the current burst boundary address, and shifts the address specified by the address specifying unit 311 in a first direction along the sub-scanning direction or a second direction opposite to the first direction by a predetermined amount. The details on the above process will be described later.

If the burst boundary address and the ending address (the address to be requested) of the reading operation falls outside an image area (falls within an non-image area), the generating unit 314 generates dummy data (for example, white data) to supplement image data (see (3)' in FIG. 6), and inputs the generated dummy data to the data receiving unit 303 instead of the read data.

The data receiving unit 303 includes an OR circuit 401 and a line-buffer write control unit 402.

The OR circuit 401 receives the dummy data from the request-generation control unit 302 and the read data (image data) from the memory controller 213 (see (5) in FIG. 6), and inputs the dummy data and the read data to the line-buffer write control unit 402.

The line-buffer write control unit 402 receives the data from the OR circuit 401, and writes the received data in the line buffer 304 (see (6) in FIG. 6). Specifically, the line-buffer write control unit 402 writes data having a predetermined number of pixels obtained in accordance with the memory access request in the line buffer 304.

Furthermore, the line-buffer write control unit 402 obtains the number of pixels from the request-generation control unit 302 every time the request-generation control unit 302 generates the memory access request.

The line buffer 304 retains data corresponding to the number of the lines that are required for the filtering process, and then sends the data to the filters 205 to 208. Specifically, the line buffer 304 stores image data corresponding to the number of the lines to be output to the write control unit 104 arranged downstream of the filters 205 to 208.

FIG. 7 is a diagram of a memory map for explaining examples of parameters that are stored in the memory 115 (parameter memory) and are set in the group of registers included in the register block 301. FIGS. 8 to 15 are diagrams for explaining examples of the parameters set in the group of registers.

As indicated by (a) in FIG. 7, the parameters set in the group of registers in each of the DMA controllers 201 to 204 (each channel of the DMA controller) are stored in the memory 115.

The parameters set in the group of registers include parameters set in a start address register, a main-scanning byte length register, a line amount register, a mode register, and an activation register as indicated by (b) in FIG. 7 and correction parameters set in a line-pixel-amount register, a correction direction register, and a correction-repeat-amount register for each correction area (an area for which skew of an image is corrected) as indicated by (c) in FIG. 7.

As shown in FIG. 8, an initial (start) address for the DMA can be set in the start address register.

As shown in FIG. 9, the byte length in the main scanning direction can be set in the main-scanning byte length register.

As shown in FIG. 10, the number of lines can be set in the line amount register.

As shown in FIG. 11, the number of tones of a pixel (image data) can be set in the mode register. The set value "0" means 1 bit, the set value "1" means 2 bits, the set value "2" means 4 bits, and the set value "3" means 8 bits. Also, a bit (ROT_180) for instructing 180 degrees rotation of an image can be set in the mode register.

As shown in FIG. 12, a parameter "1" for activating the DMA controllers 201 to 204 can be set in the activation register (see (1) in FIG. 6). If the parameter "1" is set in the activation register, the DMA controllers 201 to 204 are activated, and the request-generation control unit 302 starts its operation (see (2) in FIG. 6).

The line-pixel-amount register, the correction direction register, and the correction-repeat-amount register are prepared corresponding to the number of correction areas for which the skew of an image is corrected, and the line-pixel-amount register, the correction direction register, and the correction-repeat-amount register are arranged for each of the correction areas. The correction parameters set in the line-pixel-amount register, the correction direction register, and the correction-repeat-amount register as shown in FIGS. 13 to 15 are stored in the HDD 114 (or the ROM) as fixed data when the image forming apparatus is shipped, and are copied into the memory 115 every time the power of the image forming apparatus is turned on.

Figure 16:
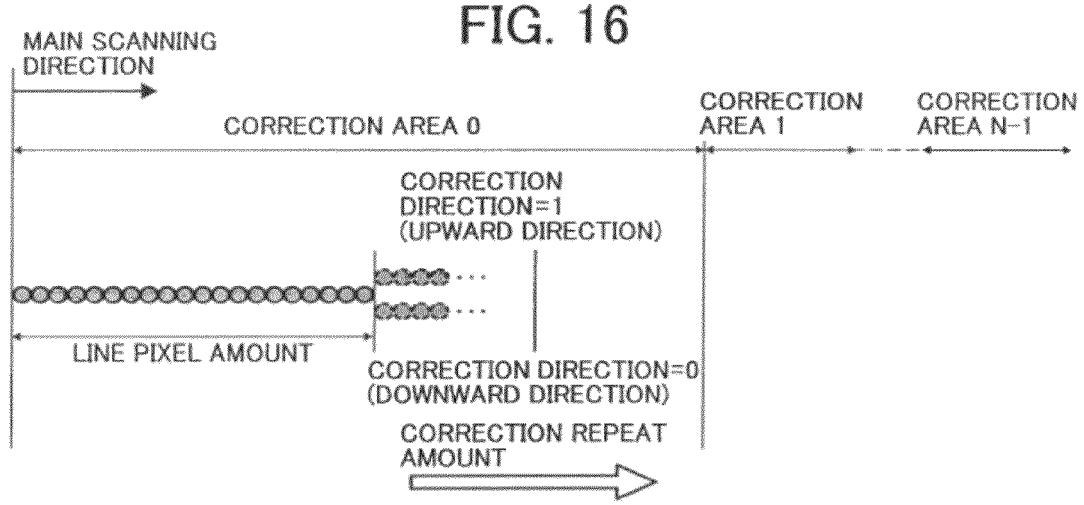
FIG. 16 is a schematic diagram for explaining a correction access operation performed by using correction parameters shown in FIGS. 13 to 15.

FIG. 16 is a schematic diagram for explaining a correction access operation performed by using the correction parameters.

Each of the DMA controllers 201 to 204 causes the memory controller 213 to access the memory 115 in a straight line in the main scanning direction corresponding to a value (set value) of the line pixel amount set in the line-pixel-amount register, thereby reading image data from the memory 115. Then, each of the DMA controllers 201 to 204 causes the memory controller 213 to access the memory 115 by shifting a memory access by one pixel in the first direction along the sub-scanning direction or in the second direction opposite to the first direction set in the correction direction register, and access the memory 115, thereby reading the image data from the memory 115. This correction access operation is repeated corresponding to a value (set value) of the correction repeat amount set in the correction-repeat-amount register. If the set value set in the line-pixel-amount register is "0" or the set value set in the correction-repeat-amount register is "0", it is determined that the correction area is not defined, and the correction access operation is not performed.

When the correction access operation is performed, correction areas from 0 to (N−1) are defined for N correction areas, and the settings are defined for each of the corresponding registers.

Different correction is performed on each of the correction areas. Specifically, the correction area is defined for each area in which the image data is skewed at the same angle in the main scanning direction. For example, if the image data is not skewed at all, the number of correction areas is set to "0". If the whole of the image data is skewed at the same angle, the number of correction areas is set to "1".

Furthermore, a virtual correction area N is defined. The correction repeat amount for the virtual correction area N is set to "1", and the line pixel amount is set to be infinite. If the length of image data in the main scanning direction is small with respect to the line pixel amount set for the correction area, the correction is performed based on the settings of the virtual correction area N. Specifically, the memory access is performed in a straight line without correction in the same manner as in the usual DMA transfer.

Figure 17:
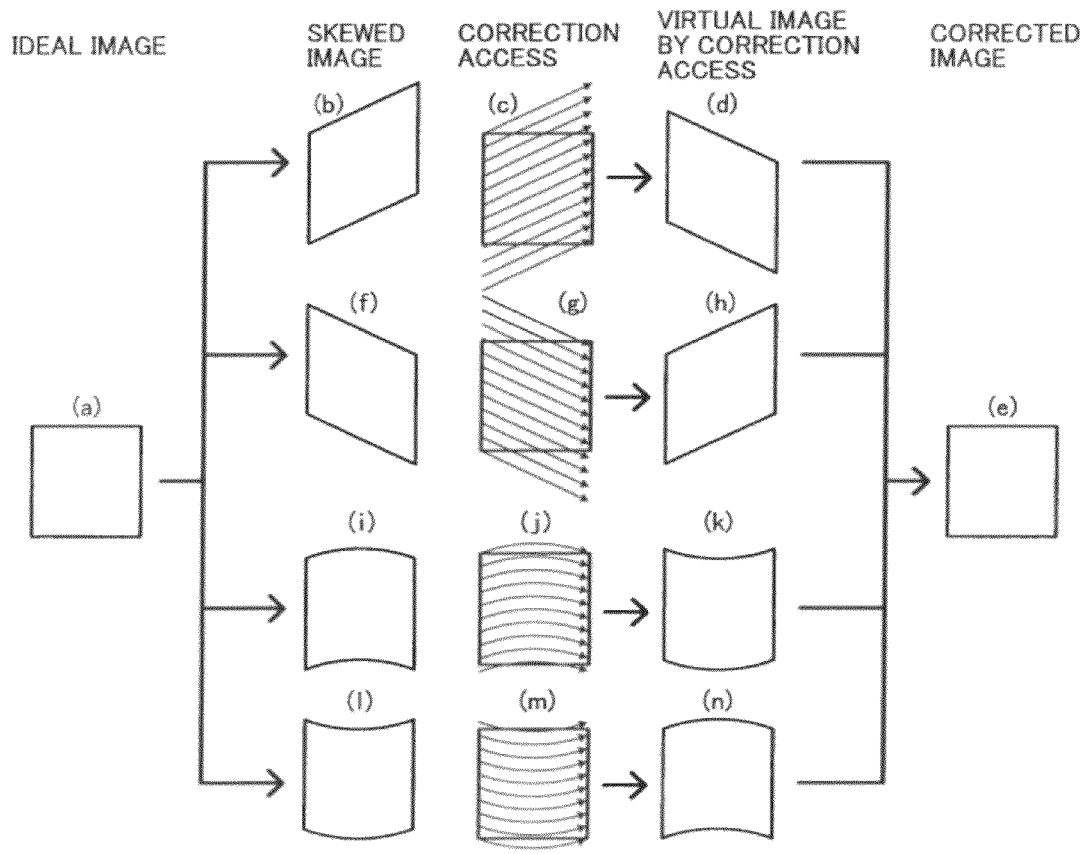
FIG. 17 is a schematic diagram for explaining skew of images and different correction accesses for the images.

FIG. 17 is a schematic diagram for explaining the skew of images and different correction accesses for the images. An image indicated by (a) in FIG. 17 is an ideal image. On the other hand, if an image is skewed in the lower-left direction as indicated by (b) in FIG. 17, each of the DMA controllers 201 to 204 shifts the memory access (read address) in the lower-left direction in advance as indicated by (c) in FIG. 17, so that the skew is offset. Thus, a virtual image as indicated by (d) in FIG. 17 is obtained by the correction access. A final image (corrected image) output from the plotter 102 is an ideal image as indicated by (e) in FIG. 17.

If the image is skewed in the lower-right direction as indicated by (f) in FIG. 17, each of the DMA controllers 201 to 204 shifts the memory access in the lower-right direction in advance as indicated by (g) in FIG. 17, so that the skew is offset. Thus, a virtual image as indicated by (h) in FIG. 17 is obtained by the correction access. A final image output from the plotter 102 is an ideal image as indicated by (e) in FIG. 17.

Because each of the images indicated by (b) and (f) in FIG. 17 is skewed at a uniform angle, the number of correction areas for each of the entire images is "1".

Because the line pixel amount for each of the correction areas can be set to any value, in combination with the setting of the correction direction, it is possible to perform the correction on an image that is skewed in an arc shape instead of a linear shape (see (i) to (n) in FIG. 17). If the image is skewed as indicated by (i) or (l) in FIG. 17, the correction area is defined for each area in which the image is skewed at the same angle, and the above process is performed on each of the correction areas, so that the correction is properly performed on the image.

Figure 18:
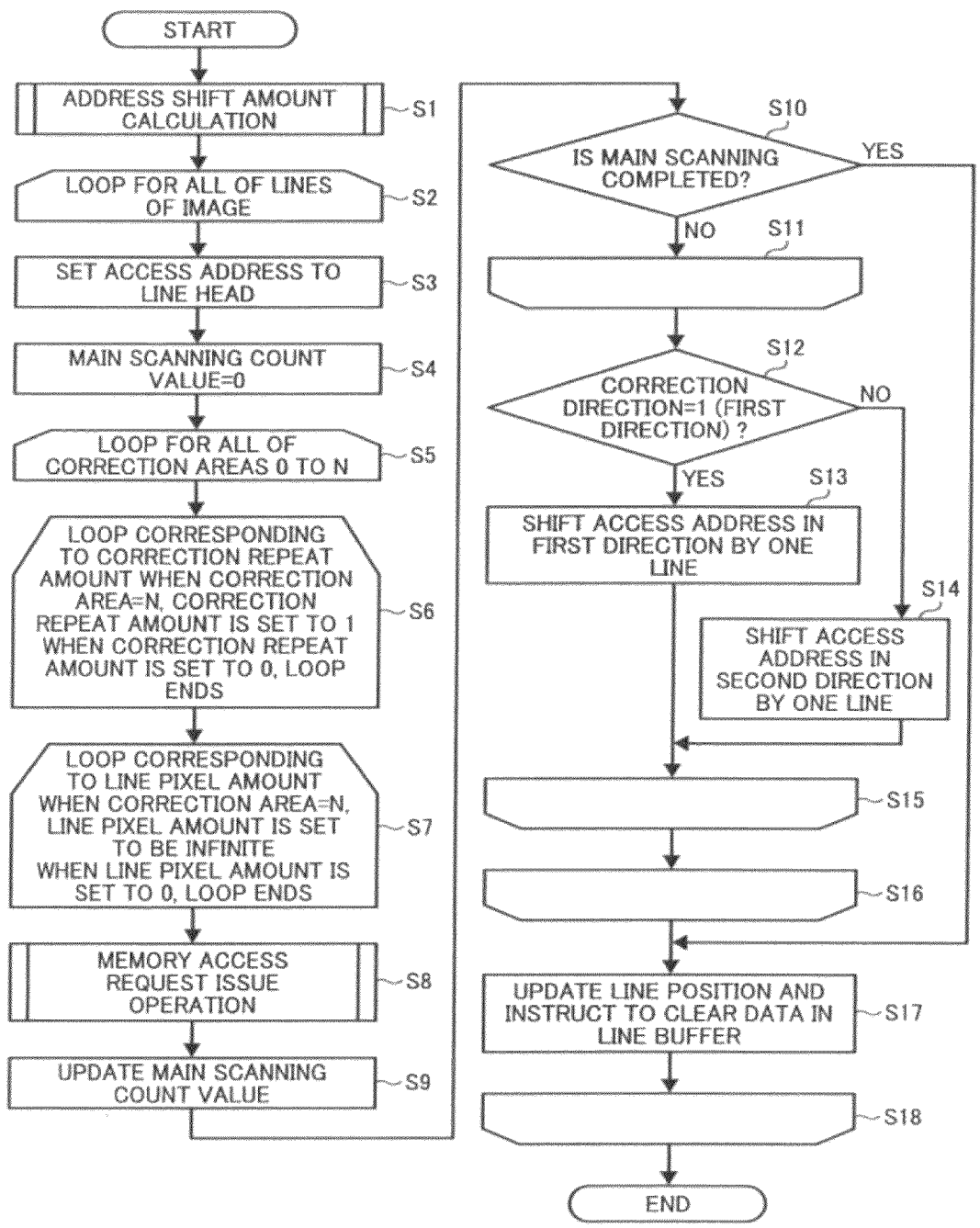
FIG. 18 is a flowchart for explaining an operation performed by a request-generation control unit of the DMA controller.
Figure 19:
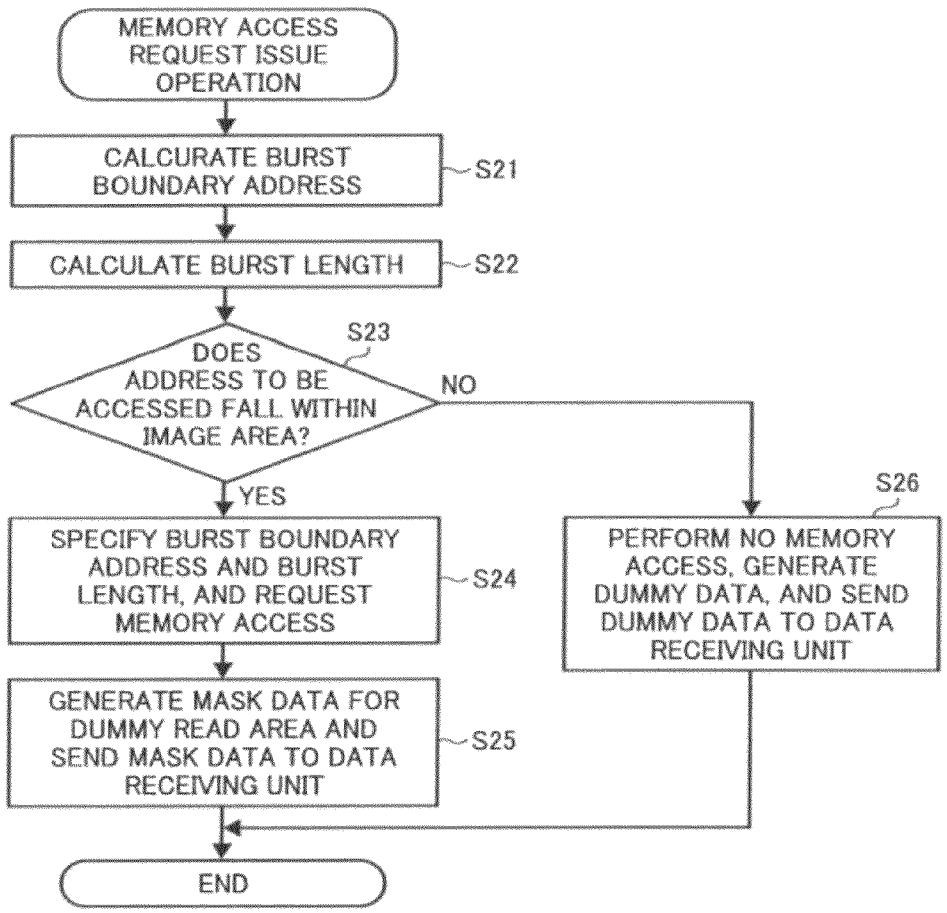
FIG. 19 is a flowchart for explaining an example of a subroutine of a memory access request issue process shown in FIG. 18.

FIG. 18 is a flowchart for explaining an operation performed by the request-generation control unit 302. FIG. 19 is a flowchart for explaining an example of a subroutine of a memory access request issue process performed at Step S8 in FIG. 18.

When "1" is set in the activation register of the register block 301, the operation shown in FIG. 18 is started. Specifically, the shifting unit 313 calculates a start-address shift amount X1 (Step S1).

Figure 20:
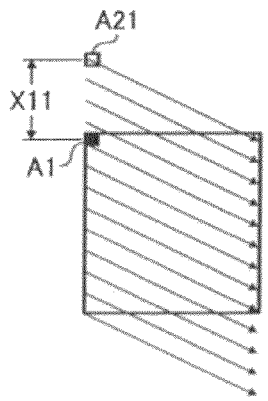
FIGS. 20 and 21 are schematic diagrams for explaining a positional relation between an image start address set in a start address register shown in FIG. 7 and a correction start address according to the embodiment.
Figure 21:
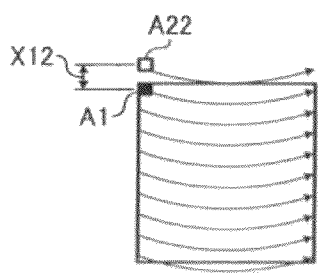

FIGS. 20 and 21 are schematic diagrams for explaining a positional relation between a start address (hereinafter, referred to as "image start address" as appropriate) set in the start address register and an address (hereinafter, referred to as "correction start address" as appropriate) from which the access is started. The image shown in FIG. 20 is skewed in the linear shape, and the image shown in FIG. 21 is skewed in the arc shape.

When each of the DMA controllers 201 to 204 reads the image data by shifting the address in the lower right direction as shown in FIG. 20, the DMA controllers 201 to 204 need to start to access from an address at a position away in the first direction from an image start address A1 set in the start address register. Therefore, the shifting unit 313 calculates a start-address shift amount X11 from the image start address A1 to a correction start address A21 from which the access is started. As shown in FIG. 21, the shifting unit 313 also calculates a start-address shift amount X12 from the image start address A1 to a correction start address A22 from which the access is started.

Figure 22:
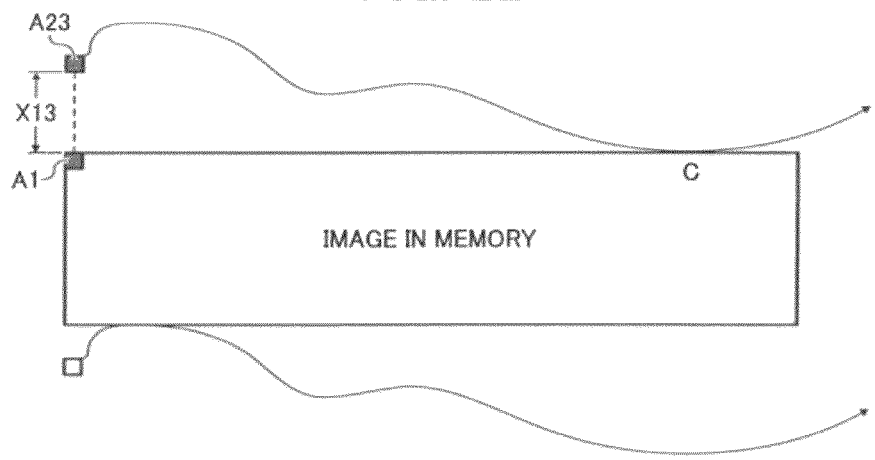
FIG. 22 is a schematic diagram for explaining a method of calculating a distance between the image start address and the correction start address in the sub-scanning direction.

FIG. 22 is a schematic diagram for explaining a method of calculating a distance between the image start address A1 and a correction start address A23 in the sub-scanning direction.

For example, the leading line including the correction start address A23 is brought into contact with the leading line of the image data in the memory 115 at a bottom position C of the correction access. Therefore, the shifting unit 313 calculates a distance (correction amount) in the sub-scanning direction from the correction start address A23 to the bottom position C, so that the shifting unit 313 can calculate a start-address shift amount X13. The start-address shift amount is obtained by Equation (1):

$$X13 = MS \times \sum_{n=0}^{M} CAn \quad (1)$$

where M means the number of correction areas from the correction area 0 to the correction area (M−1) that is located at the bottom position C, MS means main-scanning byte amount, and CA means correction amount of correction area. The relation between the number of correction areas M and the number of areas N in which all of pixels of the image data arranged in the main scanning direction is included is M<N.

If the correction direction of each of the correction areas is the first direction, the correction amount is a negative of the correction repeat amount, and if the correction direction of each of the correction areas is the second direction, the correction amount is a positive of the correction repeat amount. The correction amount of the correction area n (n=0, 1, . . . , M−1) can be obtained by adding all of the correction amount of the correction areas.

For example, if it is assumed that the number of the correction areas "n" is set to 5 (M), i.e., from the correction area 0 to the correction area 4 (M−1), and the correction amount of each of the correction areas "n" is set to "10", the start-address shift amount X1 is "MS×50". The main-scanning byte amount MS is obtained by Equation (2):

$$MS = \frac{(MP \times BP) + 7}{8} \quad (2)$$

where MP means main-scanning pixel amount and BP means bit amount of one pixel. After the shifting unit 313 calculates the start-address shift amount (X11, X12, or X13) in the above manner, the request-generation control unit 302 performs the operation at Step S2 and subsequent steps shown in FIG. 18.

The process is looped from Step S2 to Step S18 for performing the operation for all of the lines of the image from the leading line to the final line.

The address specifying unit 311 set an access address to a line head (Step S3). Because the first line is the leading line of the image, the address specifying unit 311 calculates the initial address (correction start address) of the leading line based on the start-address shift amount X1 calculated at Step S1, and determines the calculated initial address as the access address. When the current line is shifted to the next line, the address specifying unit 311 calculates the initial address of the next line based on the initial address of the current line, and determines the calculated initial address as the access address.

Then, the address specifying unit 311 sets a main-scanning count value to "0" (Step S4). The main-scanning count value indicates a value obtained by counting pixels arranged in the main scanning direction.

The process is looped from Step S5 to Step S16 for performing the operation for all of the correction areas from the leading correction area 0 to the final correction area N.

The process is looped from Step S6 to Step S15 for performing the operation corresponding to the correction repeat amount. Because no correction is performed on the correction area N, the correction repeat amount is set to "1". If the correction repeat amount is set to "0", the operation is skipped for the next correction area, and therefore this loop ends.

The process is looped from Step S7 to Step S11 for performing the operation corresponding to the line pixel amount. Because no correction is performed on the correction area N, the line pixel amount is set to be infinite. If the line pixel amount is set to "0", this loop ends.

The read request unit 312 then performs the memory access request issue operation (Step S8).

As shown in FIG. 19, the address specifying unit 311 calculates the burst boundary address (Step S21), and calculates the burst length (Step S22). Then, the address specifying unit 311 determines whether an address to be accessed falls within an image area (Step S23).

Addresses to be accessed are sequentially present from the burst boundary address to the final address of the reading operation. The address specifying unit 311 determines whether the address to be accessed is smaller than the image start address. If it is determined that the address to be accessed is smaller than the image start address, the address specifying unit 311 determines that the address to be accessed falls outside the image area. Moreover, the address specifying unit 311 determines whether the address to be accessed is larger than an image ending address (image start address+main-scanning byte length×line number−1). If it is determined that the address to be accessed is larger than the image ending address, the address specifying unit 311 determines that the address to be accessed falls outside the image area. If the above two conditions are not met, it is determined that the address to be accessed falls within the image area.

Then, if the address specifying unit 311 determines that the address to be accessed falls within the image area (Yes at Step S23), the address specifying unit 311 specifies the burst boundary address and the burst length calculated at Steps S21 and S22 to the memory controller 213, and the read request unit 312 requests the memory access to the specified address in the memory 115 (Step S24). Thus, the corresponding read data is read from the memory 115, and is sent from the memory controller 213 to the data receiving unit 303. The line-buffer write control unit 402 receives the read data, and writes the read data in the line buffer 304.

Figure 23:
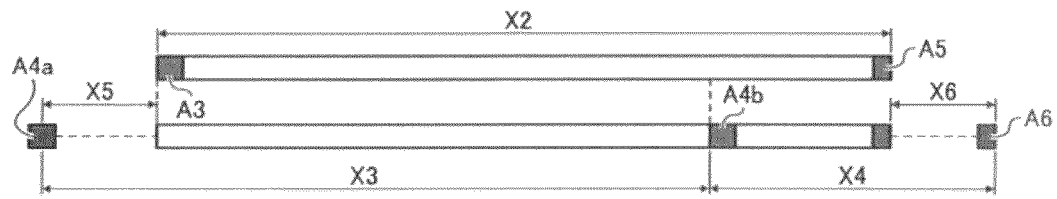
FIG. 23 is a schematic diagram for explaining an operation performed at Step S24 shown in FIG. 19.

FIG. 23 is a schematic diagram for explaining the operation performed at Step S24 in the memory access request issue operation. To improve efficiency for the memory access, the memory access from an access address A3 by a line byte amount X2 is changed to memory accesses, i.e., the memory access by a burst access length X3 from a burst boundary address A4a to a burst boundary address A4b and the memory access by a burst access length X4 from a burst boundary address A4b. The read request unit 312 then issues the memory access request in accordance with the changed memory accesses.

As described above, the memory access is performed for a required line byte amount in each of the lines. The line byte amount is obtained by Equation (3):

$$LA = \frac{(LP \times BP) + 7}{8} \quad (3)$$

where LA means line byte amount and LP means line pixel amount. However, the burst boundary address A4a is different from the access address A3. Therefore, after the address specifying unit 311 sets the access address A3 to the line head, if the address specifying unit 311 specifies the burst boundary address A4a and the burst access length X3 for the first memory access request issue operation, an unnecessary dummy access area X5 is generated from the burst boundary address A4a to the access address A3.

Moreover, because the burst length is set to a unit of 32 bits, it is possible that the image ending address A5 is different from a final address A6 of the burst access length X4. Therefore, if the address specifying unit 311 specifies the burst boundary address A4b and the burst access length X4 for the second memory access request issue operation, an unnecessary dummy access area X6 is generated from the image ending address A5 to the burst boundary address (final address) A6.

The generating unit 314 generates mask data for masking the dummy access area (dummy read area) as required, and sends the generated mask data to the data receiving unit 303 (Step S25) (see (4) in FIG. 6).

When the line-buffer write control unit 402 receives the mask data upon writing the read data in the line buffer 304, the line-buffer write control unit 402 masks the dummy access area with the received mask data.

On the other hand, at Step S23, if the above two conditions are met, and the address specifying unit 311 determines that all of the addresses to be accessed falls outside the image area (No at Step S23), the process control proceeds to Step S26.

Figure 24:
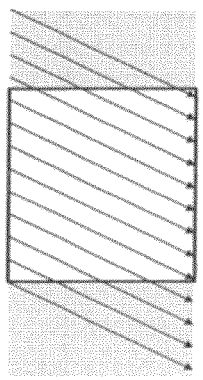
FIG. 24 is a schematic diagram for explaining an operation performed at Steps S23 and S26 shown in FIG. 19.

FIG. 24 is a schematic diagram for explaining the operation performed at Steps S23 and S26 in FIG. 19. Because the accesses for shaded areas shown in FIG. 24 fall outside the image area (falls within the non-image area), an access cycle for accessing the shaded areas is useless.

Therefore, the memory controller 213 does not perform the memory access to the memory 115, and the generating unit 314 generates the dummy data and sends the generated dummy data to the line-buffer write control unit 402 (Step S26). In this manner, the memory controller 213 does not output the read data, and the line-buffer write control unit 402 writes the dummy data in the line buffer 304.

As shown in FIG. 18, after the request-generation control unit 302 performs the memory access request issue operation at Step S8, the request-generation control unit 302 updates the main-scanning count value (adds a value corresponding to the read data to the current count value) (Step S9). Basically, the main-scanning count value is updated by the number of pixels having image data out of pixels of data (data having the burst length×N) on which the memory access is performed. In this manner, the main-scanning count value indicates the image start address of the next line after the current line is shifted to the next line in the sub-scanning direction. The address specifying unit 311 then calculates the burst length and the burst boundary address corresponding to the main-scanning count value (in other words, the image start address), and the read request unit 312 issues the memory access request based on the burst boundary address and the burst length.

Then, the request-generation control unit 302 determines whether the main scanning (writing of one line with a laser) is completed (Step S10). If it is determined that the main scanning is completed (Yes at Step S10), the process control proceeds to Step S17. If it is determined that the main scanning is not completed (No at Step S10), the process control proceeds to Step S11.

The shifting unit 313 determines whether the set value set in the correction direction register for the current correction area "n" is set to "1" (whether the correction direction is the first direction) (Step S12).

Then, if it is determined that the set value set in the correction direction register for the current correction area "n" is set to "1" (Yes at Step S12), the access address is shifted in the first direction by one line (Step S13). If the set value set in the correction direction register is set to "0" (No at Step S12), the access address is shifted in the second direction by one line (Step S14).

Although it is explained that the access address is shifted by the shifting unit 313 by one line, the access address can be shifted by a certain amount depending on a width of skew.

Figure 25:
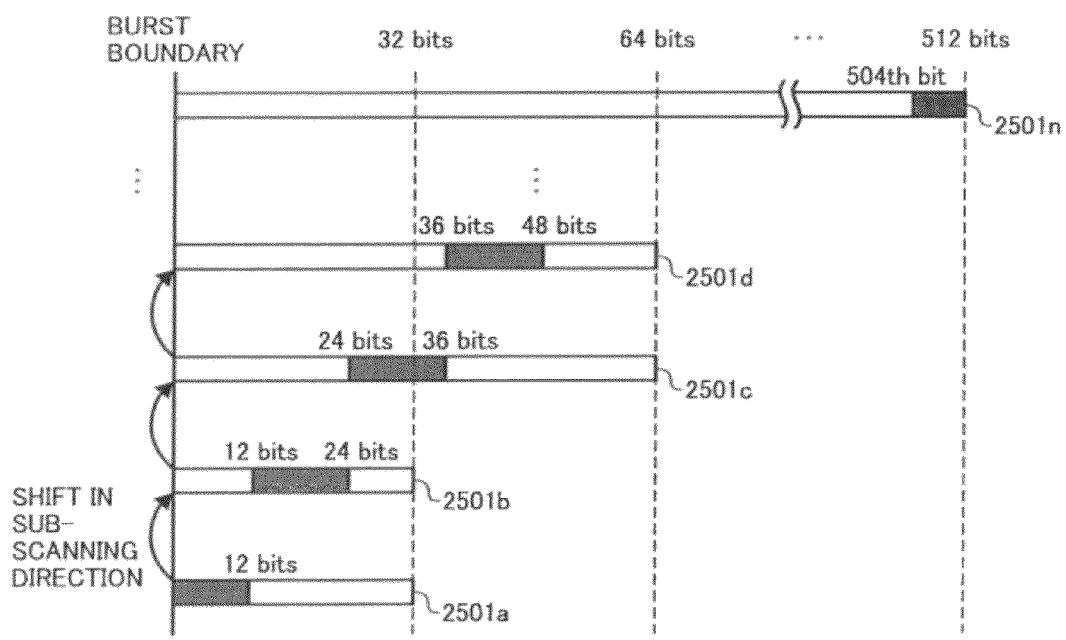
FIG. 25 is a schematic diagram for explaining an operation of shifting an access address by line and data to be read in each line at Steps S12 and S13 shown in FIG. 18.

FIG. 25 is a schematic diagram for explaining the operation of shifting the access address by line and data to be read in each line at Steps S12 and S13. In FIG. 25, the memory access is performed when the image start address matches the burst boundary address, when the line pixel amount is set to 12 bits, and when the correction direction is the first direction. A painted area is an area of image data to be obtained. Each of lines 2501a to 2501n indicates a data length for which the memory access is performed. The memory access is performed such that the shifting unit 313 shifts each of the lines 2501a through 2501n in the sub-scanning direction.

In the lines 2501a and 2501b, the memory access request is issued for the first burst length in which the image data is contained. In the line 2501c, the memory access request is issued for the first burst length and the second burst length. Although the image data is contained in only the second burst length in the line 2501d, the memory access request is issued for the first burst length and the second burst length in the line 2501d because of the burst boundary address. Although the image data pertaining to the line 2051n is stored in an area starting from a 504th bit, the memory access request is issued from the current burst boundary address to the next burst boundary address.

As shown in FIG. 18, the request-generation control unit 302 updates the position of the current line of the image (shifts the current line to the next line) and instructs the line-buffer write control unit 402 to clear data stored in the line buffer 304 (Step S17) (see (8) in FIG. 6).

Upon receiving an instruction from the request-generation control unit 302, the line-buffer write control unit 402 clears the data stored in the line buffer 304.

Figure 26:
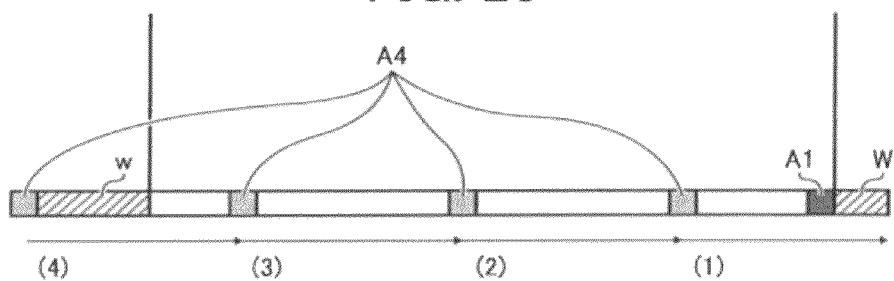
FIG. 26 is a schematic diagram for explaining an operation when a bit (ROT_180) for instructing 180 degrees rotation of an image is set in a mode register shown in FIG. 7.

FIG. 26 is a schematic diagram for explaining an operation when the bit (ROT_180) is set in the mode register. If the bit (ROT_180) is set in the mode register, the image start address A1 shown in FIG. 22 is set to an address at the lower right of the image as shown in FIG. 26. Thus, the order of the correction areas is made reverse in the horizontal direction, and the correction operation is performed by defining the correction area on the extreme right as the correction area 0. To perform the access in the reverse order of the main scanning, for example, burst boundary addresses A4 are calculated from the image start address A1, and the memory access is performed toward the burst boundary addresses A4 in the direction opposite to the forward direction of the main scanning. The read data (response data) and the mask data are written in the line buffer 304 in an inverted manner. At Step S17, the request-generation control unit 302 updates the position of the current line to the next line that is located above the current line by one line. The reference character W in FIG. 26 indicates a non-image area.

One pixel is usually represented in multiple tones in the color image and the gray-scale image. In such a case, image data is arranged in the memory in any one of units of 1 bit, 2 bits, 4 bits, and 8 bits depending on the number of bits per pixel. In the embodiment, one pixel is represented in eight tones, and 3 bits are used to represent one pixel.

The memory access can be performed in a unit of 1 burst (32 bits) by performing the above masking process, and therefore it is necessary to appropriately obtain only required image data from data having the burst length. That is, it is necessary to adjust the data length to be read in a unit of bit with higher resolution than resolution of the address.

Figure 27:
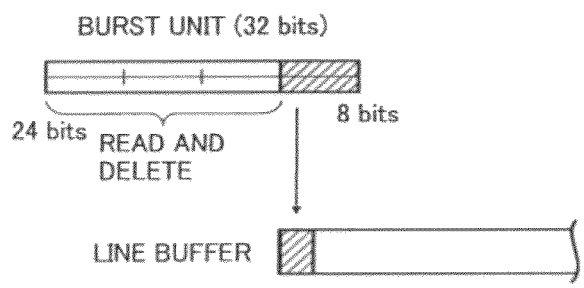
FIG. 27 is a schematic diagram for explaining an operation when a start address for reading an image is specified in a unit of bit in data obtained in a unit of 32 bits according to the embodiment.

FIG. 27 is a schematic diagram for explaining an operation when a start address for reading an image is specified in a unit of bit in data obtained in a unit of 32 bits. If the lower 2 bits of the start address is "1" and the start address is "3", the line-buffer write control unit 402 reads and deletes the leftmost 24 bits of the data, and stores the remaining valid data of 8 bits in the head of the line buffer 304.

Figure 28:
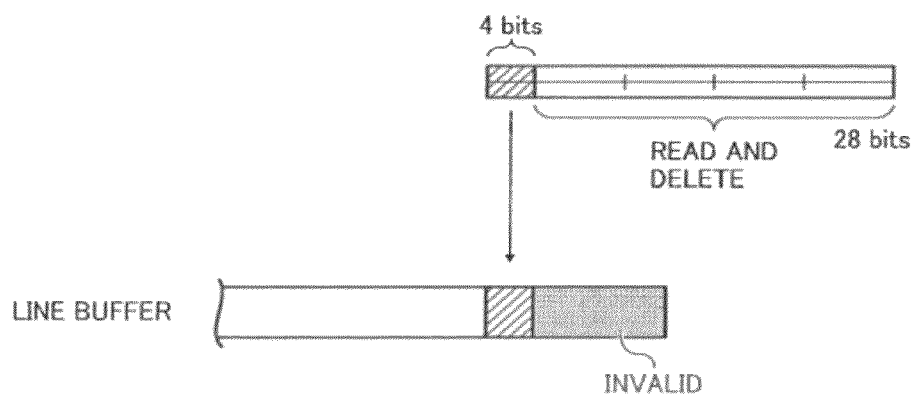
FIG. 28 is a schematic diagram for explaining an operation when an ending address for reading an image is specified in a unit of bit in data obtained in a unit of 32 bits.

FIG. 28 is a schematic diagram for explaining an operation when an ending address for reading an image is specified in a unit of bit in data obtained in a unit of 32 bits. If the ending address is allocated in a predetermined number of bits (for example, 4 bits) from the start of the burst length, only the valid data of the predetermined number of bits from the start is stored in the line buffer 304, and other bits (for example, 28 bits) are read and deleted. Alternatively, the other bits can be written in an invalid area of the line buffer 304 (because the other bits are deleted when the bits are read from the line buffer 304).

It is explained above that the main-scanning count value is basically updated by each pixel at Step S9. However, in the case of performing the operation by each bit in the above manner, the main-scanning count value cannot properly indicate the image start address.

Figure 29:
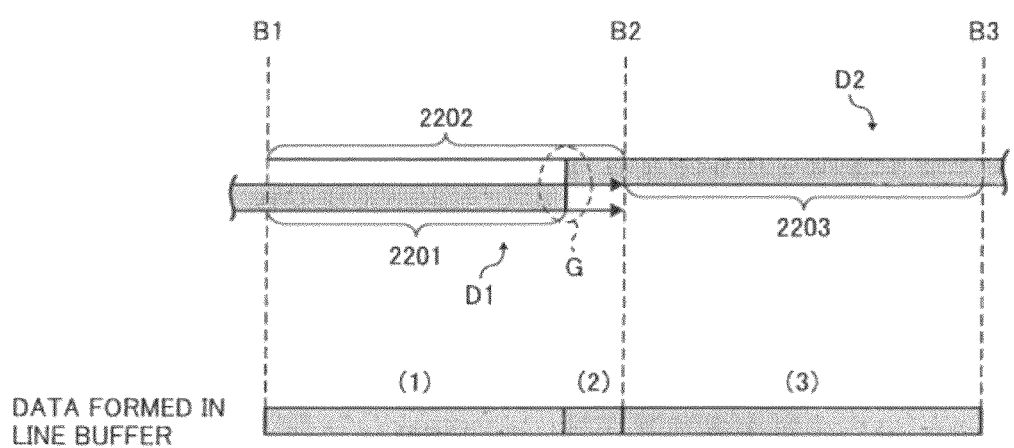
FIG. 29 is a schematic diagram for explaining an operation when a set value (the number of tones of a pixel) set in the mode register is less than "3".

FIG. 29 is a schematic diagram for explaining an operation when the set value (the number of tones of a pixel) set in the mode register is smaller than "3". If the set value set in the mode register is smaller than "3 (8 bits)", i.e., "0 (1 bit)", "1 (2 bits)", or "2 (4 bits)", when the address is shifted in any one of the first and second directions along the sub-scanning direction, the request-generation control unit 302 can specify, to the memory controller 213, addresses partially overlapping on a coordinate in the main scanning direction near an area G in two image data sets D1 and D2 arranged in a row in the main scanning direction. The reference characters B1, B2, and B3 indicate burst boundary addresses.

If the image data sets D1 and D2 are to be obtained, when the memory access is performed on the area G of a line 2201 and the area G of a line 2202, the main-scanning count value is not updated by pixels in the area G of the line 2201, and the data is obtained at the overlapping address near the area G of the line 2201 and the line 2202. Then, the main-scanning count value is updated, and the memory access is shifted to a burst boundary address B2, so that the memory access is performed on a line 2203. The data is written in the line buffer 304 or deleted from the line buffer 304 in a unit of bit, so that the tones of each of the pixels can be appropriately obtained. Thus, the image data (read data) sets D1 and D2 read by the memory controller 213 from the memory 115 can be written in the line buffer 304 without losing an edge portion of the area G at which the two corrected data sets are joined together.

As described above, when each of the DMA controllers 201 to 204 specifies an address for reading the image data in the memory 115 via the memory controller 213, each of the DMA controllers 201 to 204 shifts the specified address by a certain amount in any one of the first and second directions along the sub-scanning direction by the line pixel amount. In this manner, even if a color image is formed by a tandem type image forming apparatus (if each photosensitive element has a different skew characteristic), an expensive built-in memory for correcting the skew in the sub-scanning direction is not necessary, and it is possible to perform the correction on the skew of a write image with different colors in the sub-scanning direction without any limitation on the size of the built-in memory.

If the write image is not linearly skewed, a read area in the memory 115 is divided into a plurality of areas in the main scanning direction, and the line pixel amount, the correction direction, and the correction repeat amount are set in the DMA controllers 201 to 204 in advance for each of the divided areas (correction areas). When the DMA controllers 201 to 204 cause the memory controller 213 to specify the address in the memory 115 upon reading the image data, the DMA controllers 201 to 204 perform the operation of shifting the specified address by a predetermined amount for each of the divided areas based on the settings of the line pixel amount, the correction direction, and the correction repeat amount. Thus, it is possible to partially correct the image in a small unit, and therefore it is possible to correct the nonlinear skew in the sub-scanning direction.

Furthermore, if the address to be specified falls outside the image area, the dummy data is generated to supplement the image data, so that the unnecessary memory access for the non-image area can be eliminated, and therefore the image data can be read in a shorter time.

Moreover, depending on the number of tones of the image data (if the number of tones is less than 8 bits in the embodiment), when the address is shifted in any one of the first and second directions along the sub-scanning direction, the address is specified such that two image data sets arranged in a row in the main scanning direction are read in a partially overlapping manner, so that the effects described below can be obtained.

Specifically, although the memory access is basically performed in a unit of one byte (8 bits), the position of the memory access in the main scanning direction upon shifting in the sub-scanning direction can be set in a unit of pixel. If the position of the memory access in the main scanning direction upon shifting in the sub-scanning direction is not set just in a unit of bits constituting the pixel, two image data sets arranged in a row in the main scanning direction are read in a partially overlapping manner before and after the access address is shifted in the sub-scanning direction. Then, logical addition of the two overlapping data sets is performed, so that it is possible to correct the skew of the image with the tones of less than 8 bits in the sub-scanning direction.

Furthermore, the address is specified in the memory 115 to form an image rotated by 180 degrees by reading the image data from the memory 115 from the trail end of the image data in the main scanning direction and the sub-scanning direction. Thus, if an image forming process is performed in a duplex printing mode to form images on both sides of a recording medium, it is possible to correct the skew of the image data rotated by 180 degrees in the sub-scanning direction when the image is formed on the backside of the recording medium.

A conventional image forming apparatus includes ASICs that are included in the controller unit for processing an image and in the engine unit for writing the image. Thus, the ASICs are separately arranged because of efficiency for development, and each of the ASICs is generally developed in each of the separate units.

However, because of size reduction of the ASIC and cost advantage, an image forming apparatus has been developed such that the ASICs used in the controller unit and the engine unit are integrated together, and the ASIC is mounted in the controller unit.

The above embodiment is applied to such an image forming apparatus.

In the above embodiment, the DMA controller performs the operations according to the embodiment, such as the operation of shifting the address by a predetermined amount in any one of the first and second directions along the sub-scanning direction by the line pixel amount when the DMA controller specifies the address for reading the image data in the memory. However, the DMA controller can be omitted, and a computer (CPU) that controls the controller unit (image processing apparatus) can perform the above operation.

In such a case, a computer program used for the control is used to cause the computer to execute functions including functions of the address specifying unit and the setting unit according to the embodiment, and the computer is caused to execute such a computer program to obtain the above effects.

Although such a computer program can be stored in a storage unit, such as a ROM or an HDD, in advance, the computer program can be stored in a recording medium, such as a compact disk read only memory (CD-ROM), a flexible disk, a magneto-optical disk (MO), a CD recordable (CD-R), a CD rewritable (CD-RW), a digital versatile disc recordable (DVD+R), a DVD rewritable (DVD+RW), a DVD-R, a DVD-RW, or DVD random access memory (DVD-RAM), or a nonvolatile recording medium (memory), such as an electrically erasable programmable read-only memory (EEPROM) or a memory card. The computer program stored in the nonvolatile recording medium is installed in the controller unit and executed by the CPU, or the CPU reads the computer program from the nonvolatile recording medium and executes the computer program, so that each of the above operations is executed.

Furthermore, it is possible to execute the above operations by downloading the computer program via a network from an external device that includes a recording medium in which the computer program is recorded or an external device that includes a storage unit in which the computer program is stored.

According to one aspect of the present invention, it is possible to ensure that the skew of the image to be written is corrected with low costs.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing apparatus comprising:
   a reading unit that reads pixel data from an input storage device that stores therein the pixel data of an image obtained by optically reading the image;
   a writing unit that writes the pixel data read by the reading unit in an output storage unit that stores therein image data to be output to a write control device that performs write control of an image; and
   a setting unit that sets a line pixel amount and a correction direction, wherein
   the reading unit repeats a read operation of reading the pixel data stored in an area started from an access address and having a length specified by the line pixel amount so that the pixel data of pixels arranged in a main scanning direction is read, and shifts the access address between the read operations such that a position of the pixels of the pixel data read by the read operation is shifted in the main scanning direction by a length corresponding to the line pixel amount, and is shifted in a direction selected, according to the correction direction, from a first direction corresponding to a sub-scanning direction, which is perpendicular to the main scanning direction, and a second direction opposite to the first direction.

2. The image processing apparatus according to claim 1, wherein
   the input storage device is configured such that data stored in an area of the input storage device started from one of burst boundaries and having data length of integer multiple of burst length can be read by specifying the one of burst boundaries and the data length, and
   the reading unit reads data from the input storage device such that the read data includes the pixel data stored in an area started from the access address and having the length specified by the line pixel amount.

3. The image processing apparatus according to claim 2, wherein if an end address of the pixel data read by the reading unit by specifying a first burst boundary in a first read operation is before a second burst boundary that is next to the first boundary, the reading unit specifies, in a second read operation next to the first read operation, a third burst boundary that corresponds to a pixel located at a position that is shifted from a position of a pixel corresponding to the first burst boundary in the first direction or the second direction and is the same as the position of the pixel corresponding to the first burst boundary in the main scanning direction.

4. The image processing apparatus according to claim 2, wherein if a first burst boundary that is next to a second burst boundary is located in the pixel data read by the reading unit by specifying the second boundary in a first read operation, the reading unit specifies, in a second read operation next to the first read operation, a third burst boundary that corresponds to a pixel located at a position that is shifted from a position of a pixel corresponding to the second burst boundary in the first direction or the second direction and in the main scanning direction.

5. The image processing apparatus according to claim 1, wherein the setting unit sets the line pixel amount and the correction direction for each of a plurality of areas obtained by dividing a total area of the image of the pixel data stored in the input storage device into the plurality of areas in the main scanning direction, and
   the reading unit repeats the read operation for each of the plurality of areas.

6. The image processing apparatus according to claim 1, further comprising a generating unit that, if the address specified by the reading unit falls outside an image area, generates dummy data to supplement the image data.

7. The image processing apparatus according to claim 1, wherein, in some numbers of tones of the pixel data, an area of the image corresponding to an area of the input storage unit specified by the access address and the line pixel amount in a first read operation partially overlaps, in the main scanning direction with that in a second read operation next to the first read operation.

8. The image processing apparatus according to claim 5, wherein
   the setting unit can set the line pixel amount and the correction direction for each of colors of an image to be written by the write control device, and
   the reading unit is operated for each of the colors of the image to be written by the write control device.

9. The image processing apparatus according to claim 1, wherein the reading unit specifies the access address in the input storage device for reading the pixel data from the input storage device such that reading of the pixel data is started from a tail end of the image in the main scanning direction and the sub-scanning direction to form a rotated image that is rotated by 180 degrees.

10. An image processing method comprising:
    reading pixel data from an input storage device that stores therein the pixel data of an image obtained by optically reading the image;
    writing the pixel data read at the reading in an output storage unit that stores therein image data to be output to a write control device that performs write control of an image; and
    setting a line pixel amount and a correction direction, wherein
    the reading includes repeating a read operation of reading the pixel data stored in an area started from an access address and having a length specified by the line pixel amount so that the pixel data of pixels arranged in a main scanning direction is read, and shifting the access address between the read operations such that a position of the pixels of the pixel data read by the read operation is shifted in the main scanning direction by a length corresponding to the line pixel amount, and is shifted in a direction selected, according to the correction direction, from a first direction corresponding to a sub-scanning direction, which is perpendicular to the main scanning direction, and a second direction opposite to the first direction.

11. The image processing method according to claim 10, wherein
    the input storage device started from one of burst boundaries and having data length of integer multiple of burst length can be read by specifying the one of burst boundaries and the data length, and the reading includes reading data from the input storage device such that the read data includes the pixel data stored in an area started from the access address and having the length specified by the line pixel amount.

12. The image processing method according to claim 11, wherein if an end address of the pixel data read at the reading by specifying a first burst boundary in a first read operation is before a second burst boundary that is next to the first boundary, a third burst boundary is specified in a second read operation next to the first read operation, the third burst boundary corresponding to a pixel located at a position that is shifted from a position of a pixel corresponding to the first burst boundary in the first direction or the second direction and is the same as the position of the pixel corresponding to the first burst boundary in the main scanning direction.

13. The image processing method according to claim 11, wherein if a first burst boundary that is next to a second burst boundary is located in the pixel data read at the reading by specifying the second boundary in a first read operation, a third burst boundary is specified in a second read operation next to the first read operation, the third burst boundary corresponding to a pixel located at a position that is shifted from a position of a pixel corresponding to the second burst boundary in the first direction or the second direction and in the main scanning direction.

14. A computer program product that includes a non-transitory computer-readable recording medium and a computer program stored in the readable recording medium, the computer program when executed on a computer causes the computer to execute:
　　reading pixel data from an input storage device that stores therein the pixel data of an image obtained by optically reading the image;
　　writing the pixel data read at the reading in an output storage unit that stores therein image data to be output to a write control device that performs write control of an image; and
　　setting a line pixel amount and a correction direction, wherein
　　the reading includes repeating a read operation of reading the pixel data stored in an area started from an access address and having a length specified by the line pixel amount so that the pixel data of pixels arranged in a main scanning direction is read, and shifting the access address between the read operations such that a position of the pixels of the pixel data read by the read operation is shifted in the main scanning direction by a length corresponding to the line pixel amount, and is shifted in a direction selected, according to the correction direction, from a first direction corresponding to a sub-scanning direction which is perpendicular to the main scanning direction, and a second direction opposite to the first direction.

* * * * *